(12) United States Patent
Schneider et al.

(10) Patent No.: US 9,551,783 B2
(45) Date of Patent: Jan. 24, 2017

(54) DISPLAY WITH BACKSIDE ULTRASONIC SENSOR ARRAY

(71) Applicant: QUALCOMM Incorporated, San Diego, CA (US)

(72) Inventors: John K. Schneider, Snyder, NY (US); Jack C. Kitchens, Buffalo, NY (US); Stephen M. Gojevic, Lockport, NY (US); Timothy A. Dickinson, Carlsbad, CA (US); Samir K. Gupta, San Diego, CA (US); Kostadin D. Djordjev, San Jose, CA (US); David William Burns, San Jose, CA (US); Leonard E. Fennell, San Jose, CA (US); Suryaprakash Ganti, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 14/291,208

(22) Filed: May 30, 2014

(65) Prior Publication Data

US 2014/0355376 A1 Dec. 4, 2014

Related U.S. Application Data

(60) Provisional application No. 61/830,624, filed on Jun. 3, 2013.

(51) Int. Cl.
*G01S 7/56* (2006.01)
*G01S 15/02* (2006.01)
*G06F 3/043* (2006.01)

(52) U.S. Cl.
CPC ............... *G01S 7/56* (2013.01); *G01S 15/02* (2013.01); *G06F 3/043* (2013.01)

(58) Field of Classification Search
CPC ............ G01S 7/56; G01S 15/02; G06F 3/043
See application file for complete search history.

(56) References Cited

U.S. PATENT DOCUMENTS

| 6,988,247 | B2 | 1/2006 | Janevski |
| 8,482,535 | B2 | 7/2013 | Pryor |
| 8,793,104 | B2 * | 7/2014 | Chen ........................ G02B 6/10 703/1 |
| 2007/0200835 | A1 | 8/2007 | Choo et al. |
| 2008/0117187 | A1 | 5/2008 | Tsumura |
| 2009/0235750 | A1 | 9/2009 | Chang et al. |

(Continued)

FOREIGN PATENT DOCUMENTS

| EP | 1107102 A1 | 6/2001 |
| JP | 2007310537 A | 11/2007 |

(Continued)

OTHER PUBLICATIONS

International Search Report and Written Opinion—PCT/US2014/040444—ISA/EPO—Sep. 26, 2014.

*Primary Examiner* — Daniel Pihulic (74) *Attorney, Agent, or Firm* — Weaver Austin Villeneuve & Sampson LLP (57) ABSTRACT

A display device has a visual display capable of providing an image and an ultrasonic sensor array attached to a backside component of the visual display. The ultrasonic sensor array may be an ultrasonic area array sensor. For example, the backside component may be a backlight, an optical waveguide, or a display TFT.

54 Claims, 8 Drawing Sheets

(56) References Cited

U.S. PATENT DOCUMENTS

| | | |
|---|---|---|
| 2010/0301213 A1 | 12/2010 | Large |
| 2011/0051225 A1* | 3/2011 | Pakhchyan ............ G02B 6/005 359/291 |
| 2011/0252888 A1 | 10/2011 | Goodman et al. |
| 2014/0355376 A1* | 12/2014 | Schneider ................ G01S 7/56 367/7 |

FOREIGN PATENT DOCUMENTS

| | | | |
|---|---|---|---|
| WO | 9852184 A1 | 11/1998 | |
| WO | 0233643 A2 | 4/2002 | |
| WO | 2011143661 A2 | 11/2011 | |
| WO | 2011149793 A1 | 12/2011 | |
| WO | WO 2014197347 A1 * | 12/2014 | ............... G01S 7/56 |

* cited by examiner

DISPLAY WITH BACKSIDE ULTRASONIC SENSOR ARRAY

CROSS-REFERENCE TO RELATED APPLICATION

This application claims the benefit of priority to U.S. provisional patent application Ser. No. 61/830,624, filed on Jun. 3, 2013, the content of which is incorporated by reference.

FIELD OF THE DISCLOSURE

The present disclosure relates to visual displays and associated ultrasonic sensor arrays.

BACKGROUND

When associated in a display device having a visual display, an ultrasonic sensor is generally comprised of discrete sensors placed apart from a visual display. Such an arrangement is not ideal. By placing the sensors apart from the visual display, the size of the device is increased. For example, the size of a cell phone having both a visual display and a peripherally configured fingerprint sensor may be larger than a cell phone without the fingerprint sensor. Furthermore, commercially available visual displays do not extend functionality to the user over the full surface of the display device because the perimeter portions of the visual display are occupied by electrical components, such as light sources, electrical traces, address lines and electronic circuitry for providing an image to the user. Additionally, air gaps or voids between layered components of commercially available displays may introduce barriers to the transmission of high-frequency ultrasonic energy, complicating efforts to obtain accurate information about an object that is being sensed.

SUMMARY OF THE DISCLOSURE

This disclosure provides information about a device having a visual display that is capable of providing an image, and an ultrasonic sensor array, such as an ultrasonic area array sensor, attached to a backside component of the visual display. The backside component may be a backlight, and the ultrasonic sensor array may be attached to a surface of the backlight that is furthest from an imaging surface, such as a platen or cover glass of the display device, or may be attached to a surface of the backlight that is closest to the imaging surface of the display device. Also, the ultrasonic sensor array may be positioned between a backlight and a bottom polarizer of the visual display, or attached to the display TFT of the visual display.

The backside component may be a waveguide. The waveguide may be wedge shaped. The ultrasonic sensor array may be attached to the waveguide so that a sensing area of the sensor array is angled relative to an imaging surface of the visual display.

In some embodiments, the ultrasonic sensor array may be attached to a spacer, and the spacer may be attached to a backside component of the visual display. For example, such a spacer may be included so that the ultrasonic sensor array is positioned from the imaging surface by a desired distance, and/or is insulated from other components of the device. In such an embodiment, the ultrasonic sensor array is considered to be attached to the backside component of the visual display even though the spacer exists between the ultrasonic sensor array and the backside component of the visual display.

The ultrasonic sensor array has a sensing area, and the visual display has an image-providing area. The sensing area may be smaller than the image-providing area. Or, the sensing area may be about the same size as the image-providing area. Or, the sensing area may be larger than the image-providing area.

The visual display may include liquid crystal material (e.g. an LCD panel), organic light emitting diodes (e.g. an OLED panel), one or more LEDs, or at least one cold cathode fluorescent lamp to produce an image.

The visual display may have a waveguide with light-turning features. Such light-turning features may be filled with a non-gaseous material such as an OCR, an OCA, an epoxy or a PSA that allows for transmission of ultrasonic energy emitted by the ultrasonic sensor array with minimal loss of ultrasonic energy. Such a material may have an acoustic impedance of between about 1.5 to 15 MRayls.

The visual display may have one or more component layers bonded to each other with an acoustically transmissive material, for example, a material having acoustic properties similar to the component layers.

The visual display may have at least one component layer that has an acoustically transmissive material filling interstices of the at least one component layer.

This disclosure provides information about a non-transitory computer-readable medium having stored instructions that are executable by a processor to cause the processor to perform operations that (a) display an image via a visual display, and detect an object via an ultrasonic sensor array that is attached to a backside component of the visual display. The visual display, ultrasonic sensor array and backside component may be those described above.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION

This disclosure describes several types of devices 1, each having a visual display 4 and an ultrasonic sensor array 7. The visual display 4 has the ability to provide an image to a user via a viewing-side 10 of the visual display 4. Typically, the image is provided to the user via an imaging surface 13, which protects the devices that produce the image and may include one or more layers of substantially transparent material, such as polycarbonate or sapphire. The imaging surface may alternatively be referred to as a "cover glass" or a "cover lens", and may be made from glass or non-glass materials such as plastic, sapphire, or other suitable materials. The imaging surface 13 may include additional scratch-resistant and glare-resistant layers, and may include layers for forming a touch screen. The imaging surface 13 may serve as a platen for fingerprint detection.

The visual display 4 is often comprised of several different components, which when assembled together cooperate to provide the image to the user. When such components reside in the path of the image being provided to the user, such as the imaging surface, they are referred to herein as residing on the "image side". Opposite the image side is the "backside". That is to say that components not residing in the path of the image being provided to the user are referred to herein as residing on the "backside" of a component of the visual display 4.

Figure 1:
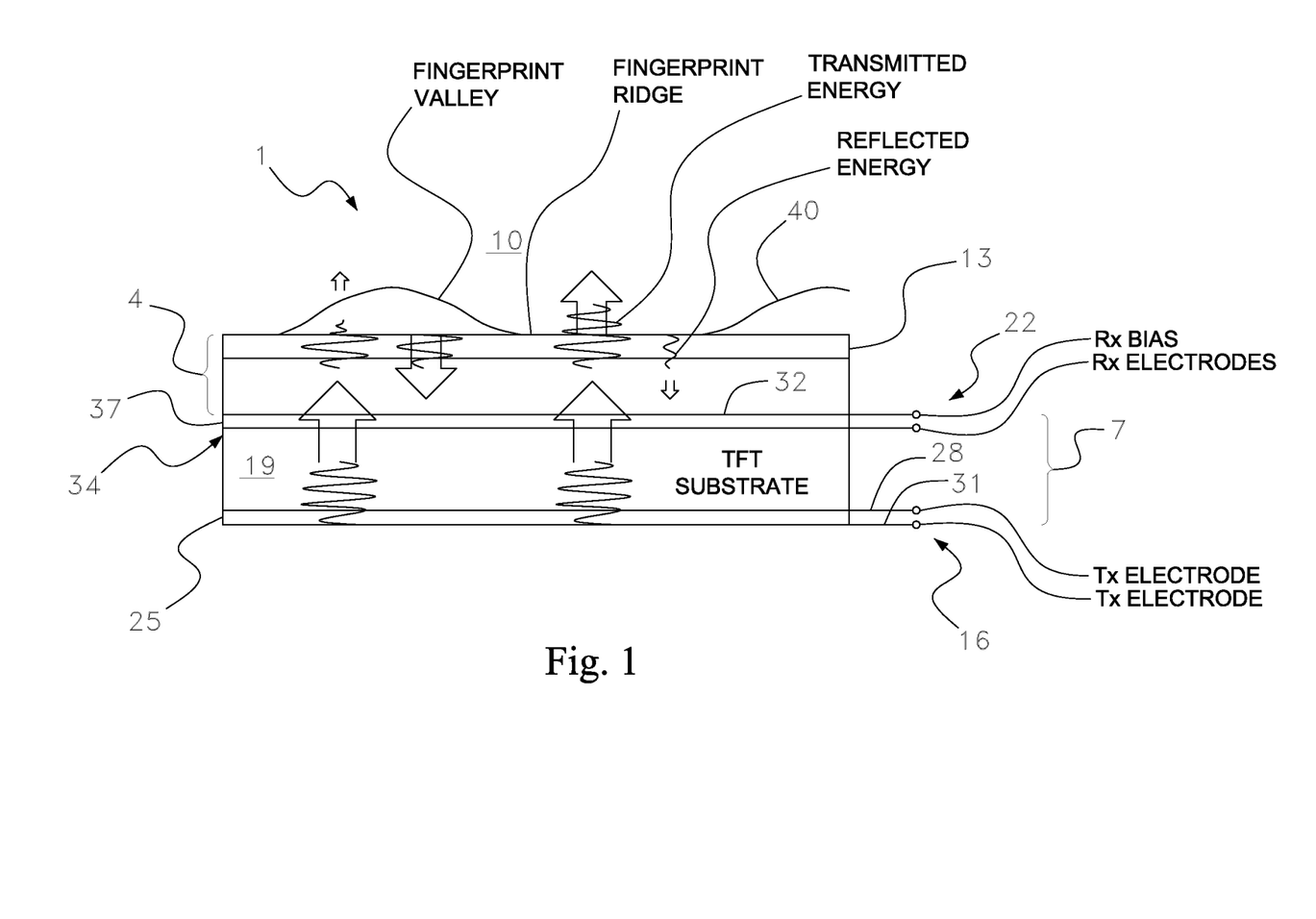
FIG. 1 depicts an ultrasonic sensor array coupled to a visual display, and a finger positioned on a surface of the display device.

FIG. 1 generically depicts a combination of a visual display 4 and an ultrasonic sensor array 7. An ultrasonic transmitter 16 is shown in FIG. 1 attached to a first side of a TFT substrate 19, and an ultrasonic receiver 22 is shown attached to a second side of the TFT substrate 19. The ultrasonic transmitter 16 may be a piezoelectric transmitter that can generate ultrasonic waves. For example, the ultrasonic transmitter 16 may be a plane wave generator including a substantially planar piezoelectric transmitter layer 25. Ultrasonic waves may be generated by applying a voltage across the piezoelectric layer 25 in order to expand or contract the layer 25, depending upon the voltage signal applied, thereby generating a plane wave. The voltage may be applied to the piezoelectric transmitter layer 25 via a first transmitter electrode 28 and a second transmitter electrode 31. The ultrasonic receiver 22 may include a receiver bias electrode 32 coupled to a piezoelectric receiver layer 37. The ultrasonic receiver 22 may be coupled to an array of pixel input electrodes 34 that are connected to TFT circuitry on the TFT substrate 19. An imaging surface 13 provides a surface on which a finger 40 is shown residing.

Examples of piezoelectric materials that may be employed according to various implementations include piezoelectric polymers having appropriate ultrasonic properties. For example, a suitable piezoelectric material may have an acoustic impedance of between about 2.5 MRayls and about 5 MRayls. When used herein, the word "acoustic" and variations thereof refers generally to many types of longitudinal waves, including ultrasound. In particular, piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

In operation, the ultrasonic transmitter 16 may generate and emit an ultrasonic pulse. The pulse may travel through layers of the visual display 4 toward and through the imaging surface 13. An object 40 positioned or residing on the imaging surface 13 may transmit or absorb some of the ultrasonic energy while some of the ultrasonic energy that is not transmitted or absorbed by the object 40 may be reflected back through the imaging surface 13 and other layers of the device 1 to the ultrasonic receiver 22 (a.k.a. "detector"). For example, when a finger 40 is placed upon a surface of the imaging surface 13, the friction ridges of the finger 40 contact the imaging surface 13, while air contacts the imaging surface 13 where there are valleys between the friction ridges of the finger 40. When ultrasound from the ultrasonic transmitter 16 reaches the surface of the imaging surface 13 on which the finger 40 resides, a portion of the ultrasonic energy may pass into the finger 40 at those locations where the ridges of the finger 40 contact the imaging surface 13 and substantially reflect at those locations where the ridges do not contact the imaging surface 13 (i.e. the valleys of the finger 40). The reflected ultrasonic energy travels through the imaging surface 13 to the receiver 22, where the reflected ultrasonic energy is detected. By identifying areas of the receiver 22 that detect the reflected ultrasonic energy and areas that do not detect reflected ultrasonic energy, a data set corresponding to the fingerprint can be created. That data set may be used to create an image of the fingerprint, or may be compared to other data sets in order to determine whether a match exists. It should be noted that multiple fingerprints or other biometric features may be captured in parallel if the user places multiple fingers, a palm, or other objects on the imaging surface 13.

Figure 2:
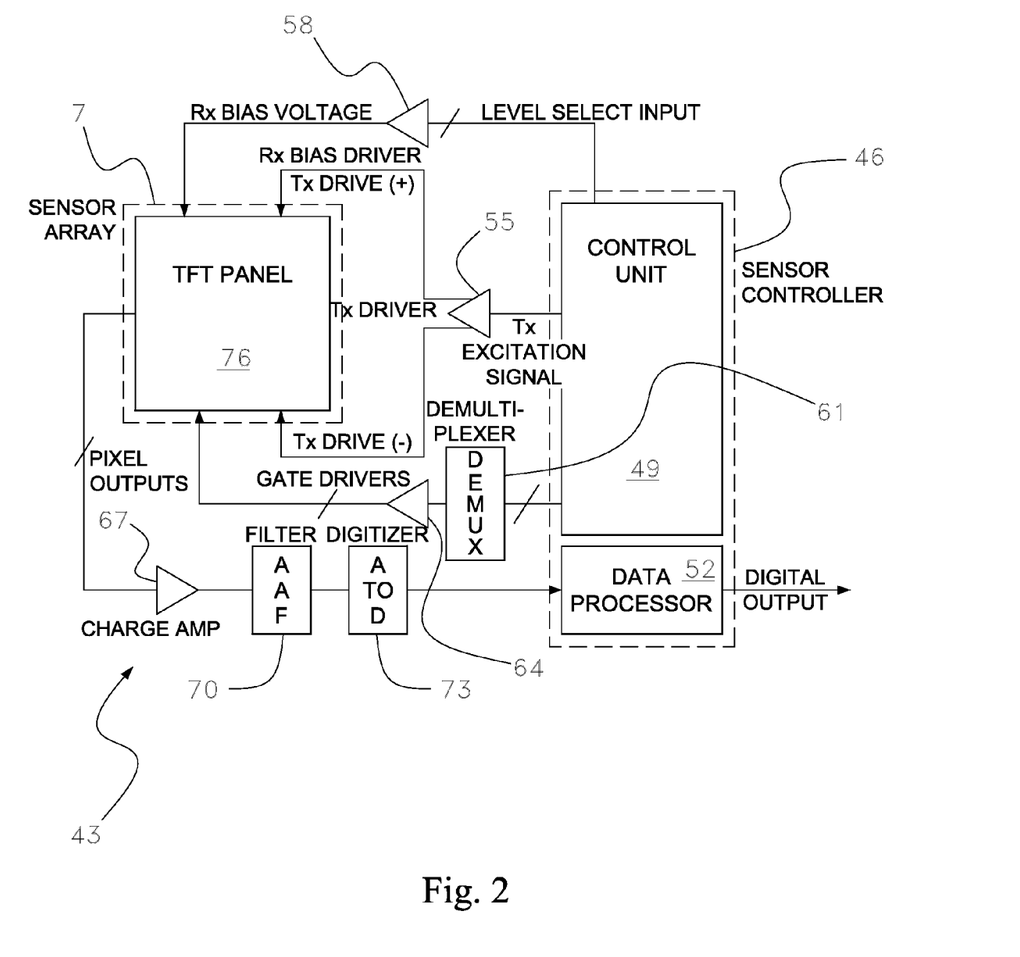
FIG. 2 shows a block diagram of an ultrasonic sensor system.

FIG. 2 is a high-level block diagram schematic that depicts an example of an ultrasonic sensor system 43. Many of the elements shown may form part of the control electronics. A sensor controller 46 may include a control unit 49 that is configured to control various aspects of the sensor system 43, for example, (a) ultrasonic transmitter timing and excitation waveforms, (b) bias voltages for the ultrasonic receiver and pixel circuitry, (c) pixel addressing, (d) signal filtering and conversion, and (e) readout frame rates, among other aspects. The sensor controller 46 may also include a data processor 52 that receives data from the ultrasonic sensor array 7, and translates that data into image data corresponding to the object that resides on the imaging surface 13, or formats the data for further processing.

The control unit 49 may send a transmitter (Tx) excitation signal to a Tx driver 55 at regular intervals to cause the Tx driver 55 to excite the ultrasonic transmitter 16 and produce planar ultrasonic waves. The control unit 49 may send level select input signals through a receiver (Rx) bias driver 58 to bias the receiver bias electrode and allow gating of acoustic signal detection by the pixel circuitry. A demultiplexer 61 may be used to turn on and off gate drivers 64 that cause a particular row or column of the sensor pixel circuits to provide output signals from the array of pixel input electrodes 34 of the sensor array 7. Output signals from the sensor array 7 may be sent through a charge amplifier 67, a filter 70 (such as an RC filter or an anti-aliasing filter), and a digitizer 73 to the data processor 52. Note that portions of the ultrasonic sensor system 43 may be included on the TFT panel 76 and other portions may be included in an associated integrated circuit.

Visual displays 4 come in many types, including those employing OLED, LCD, emissive, reflective, transmissive, transflective, interferometric or microshutter technologies. Visual displays 4 may include a number of components (see FIGS. 6-9). Depending on the type of visual display 4, these components may include an imaging surface 13, one or more polarizers 79, a color filter glass 82, a layer of liquid crystal material 85, display TFTs 88, a substrate to which the TFTs are positioned, optical waveguides 91 configured to distribute light from one side of the visual display 4 to another and change the direction of the light in order to provide an image to the user, backlight enhancement films 94 ("BEF"), modified prism films (e.g. prisms up or prisms down, prisms with rounded points and/or valleys, modified prism angles), and diffuser sheets 97. The optical waveguide 91 may be planar or wedge shaped. An optical waveguide 91 may be associated with one or more edge light sources or a backside light array that may include one or more LEDs or cold-cathode fluorescent lights (CCFLs). The optical waveguide may be wedge-shaped to encourage effective light-turning via TIR (total internal reflection). A bottom reflector such as a coating or partial coating of white paint, metal, or multi-layer dielectrics may be included on a planar or wedge-shaped waveguide to turn light towards the display pixels and to prevent unwanted emission of light though the backside of the waveguide. By carefully selecting the materials and positioning of display components, ultrasound can effectively pass through a visual display 4.

Ultrasonic sensors permit gathering of information. In particular, an ultrasonic sensor array may be manufactured as a small, discrete unit that can be fabricated in different sizes, and such arrays are able to detect very small features, such as the ridges and valleys of a friction ridge surface of a finger 40. An ultrasonic sensor array 7 may be properly sized and positioned on a visual display component so that the sensing area of the ultrasonic sensor array 7 effectively covers part (see FIG. 3A) or all (see FIG. 4) of the image-providing area of the visual display 4.

Figure 3A:
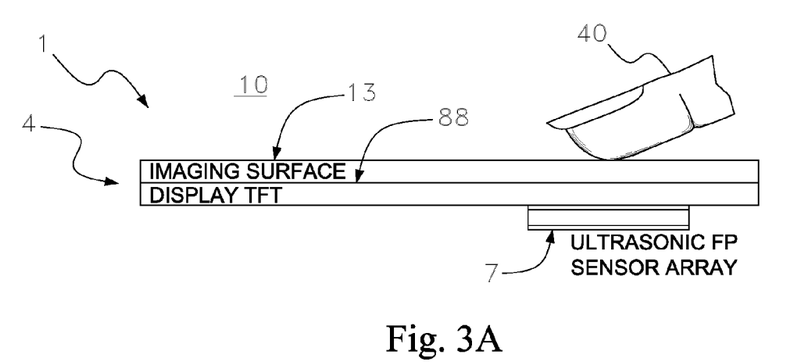
FIG. 3A depicts an ultrasonic sensor array attached to a visual display, where the ultrasonic sensor has a sensing area that is smaller than an image-providing area of the visual display.
Figure 3B:
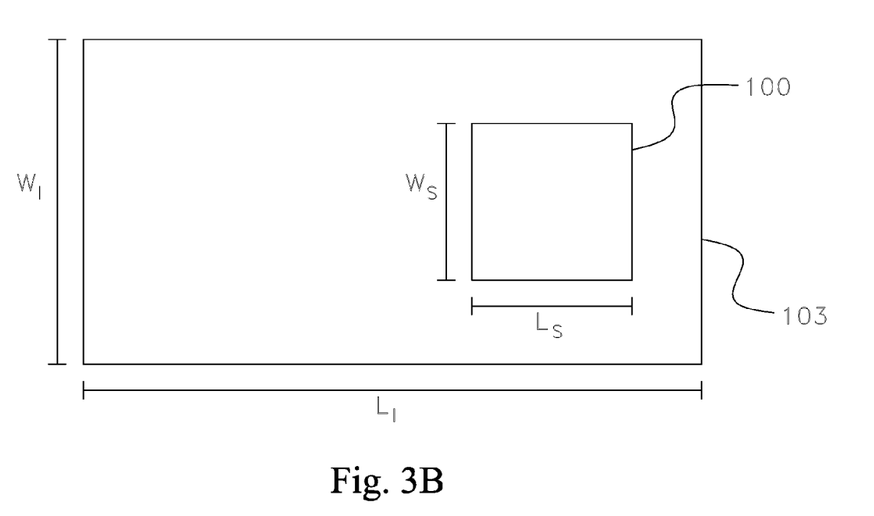
FIG. 3B is a plan view of the arrangement depicted in FIG. 3A.
Figure 4:
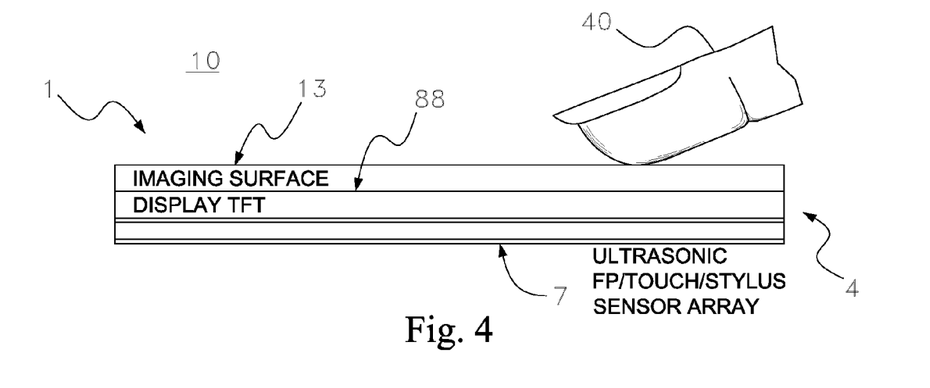
FIG. 4 depicts an ultrasonic sensor array attached to a visual display, where the ultrasonic sensor has a sensing area that is about the same size as the image-providing area of the visual display.

FIG. 3B depicts a plan view showing the relative positioning and size of a sensing area 100 associated with the ultrasonic sensor array 7 and an image-providing area 103 of the visual display 4 depicted in FIG. 3A. The sensing area 100 allows information about an object that is near to or on a surface of the visual display 4 to be gathered. FIG. 3B depicts a sensing area 100 that has a length $L_S$ and width $W_S$. FIG. 3B also identifies a length $L_I$ and width $W_I$ of the image-providing area 103 from which the visual display 4 may provide an image. In the embodiment depicted in FIG. 3A and FIG. 3B, the area ($L_S \times W_S$) of the sensing area 100 is smaller than the area ($L_I \times W_I$) of the image-providing area 103. In the embodiment depicted in FIG. 4, the sensing area 100 is substantially the same size as the image-providing area 103.

Figure 5A:
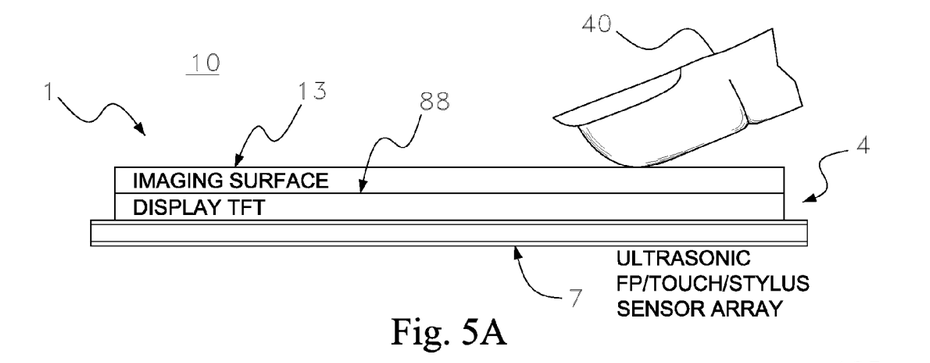
FIG. 5A depicts an ultrasonic sensor array attached to a visual display, where the ultrasonic sensor has a sensing area that is larger than an image-providing area of the visual display.

Alternatively, the ultrasonic sensor array 7 may be sized so that the sensing area 100 extends beyond one or more edges of the visual display 4 (see FIG. 5A), and this arrangement affords an opportunity to make the region near the image-providing area 103 available for collecting information and/or receiving instructions from the user via the ultrasonic sensor array 7. For example, control icons may be positioned within the image-providing area 103 and used to identify a location where a user may provide biometric information (e.g. a fingerprint), and/or predetermined control instructions to a device (e.g. a cell phone) associated with the visual display 4. The ultrasonic sensor array 7 may be attached to a backside component of the visual display 4 by an adhesive, and such adhesives may be those formed from a resin, an epoxy, an acrylic, a polyurethane, a polymeric coupling layer, a pressure-sensitive adhesive, or a glue.

Figure 5B:
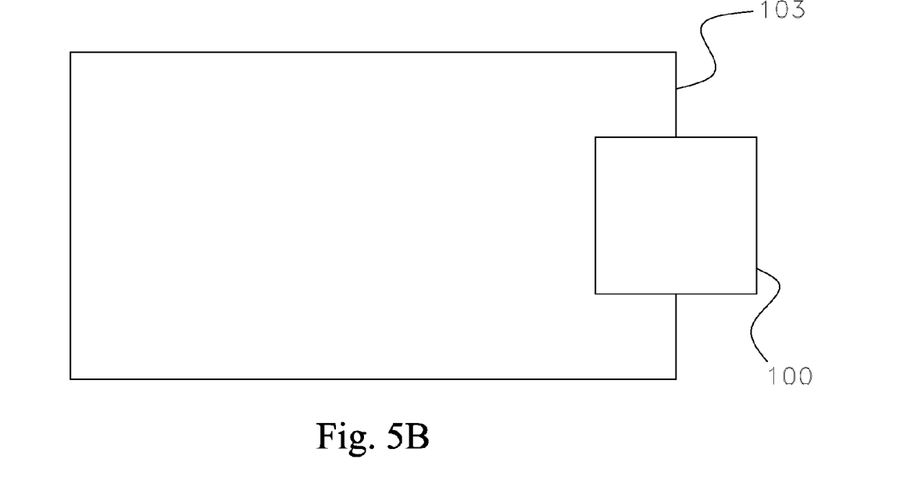
FIG. 5B depicts an ultrasonic sensor array attached to a visual display, where the ultrasonic sensor has a sensing area that is smaller than the image-providing area, and the ultrasonic sensor is offset relative to the image-providing area such that a portion of the ultrasonic sensor extends beyond a boundary of the image-providing area.
Figure 6:
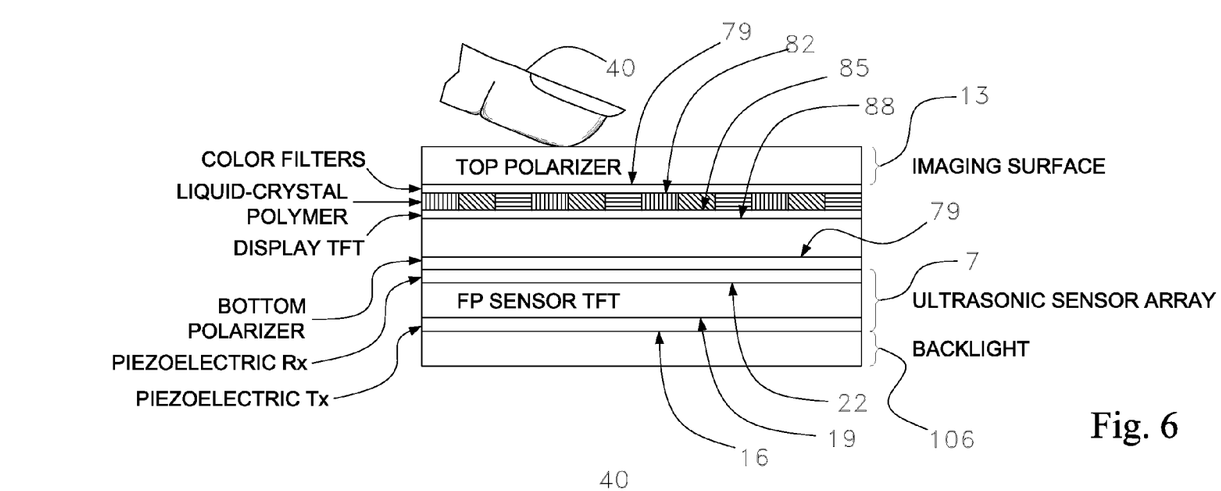
FIG. 6 depicts components of an ultrasonic sensor array and a visual display, where the ultrasonic sensor array is positioned between a backlight and other components of the visual display.

FIG. 5B depicts a further embodiment in which the ultrasonic sensing area 100 is smaller than the image-providing area 103, but the sensing area 100 is offset so that part of the sensing area 100 extends beyond an edge of the image-providing area 103. In this manner, advantages of the embodiments depicted in FIG. 3A and FIG. 5A may be realized. In some implementations, the sensing area 100 may overlap the image-providing area 103 on one or more sides.

It should be noted that the sensing area 100 and/or the image-providing area 103 need not be rectangular. Other shapes are possible. And yet, the concepts identified above with respect to the relative sizes of the sensing area 100 and image-providing area 103, as well as the positioning of those areas 100, 103 is nevertheless applicable for areas 100, 103 having shapes other than rectangular.

When the ultrasonic sensor array 7 is used to collect a fingerprint, an icon such as an outline of a box, a filled rectangle, or a coarse image of a fingertip may be used to direct a user when and where on an imaging surface 13 of the visual display 4 to place a finger 40 for generating an image of the user's friction ridge surface. A user may be directed to press a finger 40 on a portion of the visual display 4 by showing the icon on the visual display 4 at an appropriate time. In configurations where the ultrasonic sensor array 7 is substantially the same size as the image-providing area 103 (FIG. 4), the icon or other position-indicating graphic or text may be shown anywhere on the image-providing area 103. In configurations where the sensor array 7 is smaller than the visual display 4 (FIG. 3), the icon, graphic or text may be displayed in a region above the active area of the ultrasonic sensor array 7 so that an image of the user's friction ridge surface may be acquired. After a user's fingerprint has been acquired, the icon may be removed from the image-providing area 103. To alert the user that the finger 40 may be removed, a text command, an audible command, a visual feature provided via the image-providing area 103, a haptics response, or other suitable alert may be provided to the user.

When coupled with a visual display 4, the ultrasonic sensor array 7 may be used to detect objects that contact an imaging surface 13 of the visual display 4. Such objects may include a finger 40 or a stylus. As a result, an icon may be displayed via the visual display 4, and the user may then select that icon by lightly pressing or tapping (with the finger 40 or stylus) the imaging surface 13 in the area of the icon. The pressing or tapping may be detected by the ultrasonic sensor array 7 (with or without the generation of an ultrasonic wave by the ultrasonic transmitter) and the detection may be used to initiate a function or cause another action to occur.

The size and spacing of the pixel input electrodes 34 may be selected to provide a desired resolution. Thus, configurations of ultrasonic sensor arrays 7 may be manufactured to provide high, medium or low resolution. It is therefore possible to select a visual display 4 and an ultrasonic sensor array 7 having similar resolutions, or differing resolutions. In some implementations, the resolution may be set electronically by selecting specific rows and columns or by omitting specific rows and columns such as every other row and column when acquiring image information from the ultrasonic sensor array 7.

In some configurations, the ultrasonic sensor array 7 may be positioned between a backlight 106 and a bottom polarizer 79 of the visual display 4 (see FIG. 6), or higher in the stack of components comprising the visual display 4. For example, the ultrasonic sensor array 7 may be attached to the display TFT 88 (see FIGS. 3A, 4, and 5A). When the ultrasonic sensor array 7 is located in this position, the ultrasonic sensor array 7 may partially occlude light emanating from the backlight 106, but the loss of light transmission emitted from the backlight 106 and passing through the visual display 4 can be minimized. For example, the ultrasonic sensor array 7 may be fabricated on a transparent substrate such as a glass or plastic that is substantially transparent. Thin-film transistors (TFT) formed on the substrate can be made from moderately transparent semiconductor layers such as indium-gallium zinc oxide (IGZO) or thin amorphous or polycrystalline silicon. Metal layers often used for metal interconnects may be made narrow and in some configurations made sparse, and thereby minimally occlude the transmission of light. Alternatively, a transparent conductive material such as indium-tin-oxide (ITO) or indium-zinc-oxide (IZO) may be used for the electrical interconnections between TFT circuitry. In configurations where the ultrasonic sensor array 7 traverses the entire visual display 4, the optical emission from the backlight 106 can be increased to compensate for some losses due to the inclusion of the ultrasonic sensor array 7. In configurations where the ultrasonic sensor array 7 traverses merely a portion of the image-providing area 103, the backlight 106 can be configured to emit more light in that portion. Alternatively, a slightly absorptive filter layer may be positioned around the ultrasonic sensor array 7 that is positioned between the backlight 106 and other components of the visual display 4 in order to allow substantially uniform transmission of light from the image-providing area 103. In some implementations, reflective features may be placed locally underneath occluding regions of the sensor array 7 to reflect light back into the backlight, allowing the light to be recycled and re-emitted in a non-occluded region of the sensor array 7. These configurations may allow the ultrasonic energy from the ultrasonic sensor array to traverse the layers comprising the visual display 4 with minimal reflections from each layer, and thus avoid some of the reflections that can occur, for example between layers having widely differing acoustic impedances, while substantially maintaining the efficiency of the backlight.

Figure 7:
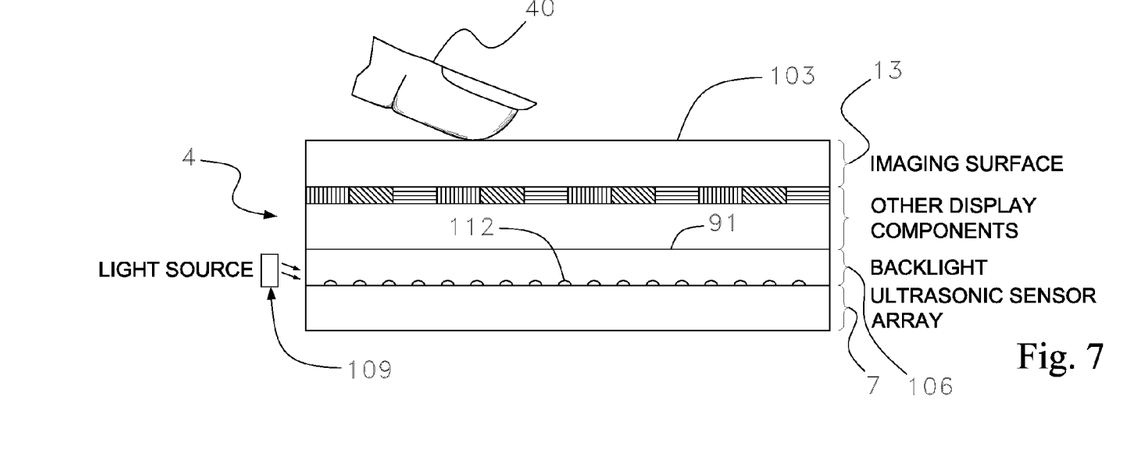
FIG. 7 depicts components of an ultrasonic sensor array and a visual display, where the ultrasonic sensor array is positioned behind a backlight of the visual display.

FIG. 7 shows a cross-sectional view of a visual display 4 having a planar light-guide backlight 106 with an ultrasonic sensor array 7 positioned behind all or part of the backlight 106. The planar light guide backlight 106 has a light source 109 near one or more sides of the visual display 4. The light source 109 may include a cold-cathode fluorescent light (CCFL), an array of one or more white LEDS, an array of multi-colored LEDs (e.g. red, green and blue), or other suitable emitter of light. The optical waveguide 91 of the backlight 106 may have dots 112 of white material selectively placed on the backside of the waveguide 91 so that light traveling through the waveguide 91 strikes the white dots 112 and is reflected upwards towards the image-providing area 103. Light not striking a dot may continue to travel in the optical waveguide 91, reflecting off of the top and bottom surfaces of the waveguide 91 by total internal reflection (TIR) until striking a dot. The dots 112 may be positioned with varying areal density or size to provide a substantially uniform emission of light from the edge-lit backlight 106. Alternatively, the optical waveguide 91 may have light-turning features formed into the glass, such as small facets. The facets may be round, square or rectangular, with curved or angled sidewalls to redirect light that is traveling along the optical waveguide 91 towards the image-providing area 103. The facets may be, for example, truncated circular cones with an angled or curved sidewall and a flat bottom. The facet sidewalls may be coated with a thin layer of patterned metal to further increase the reflectivity. The facets may be filled with a solid material such as a metal, an adhesive or a polymer that allows the transmission of acoustic energy from the ultrasonic sensor array 7 with minimal loss. The facets may be selectively formed with a varying areal density or size to provide a substantially uniform emission from the backlight 106.

With respect to arrangements like the arrangement depicted in FIG. 7, it should be noted that voids or gaps in and between the components should be minimized so as to foster a more uniform transmission of the ultrasonic waves through the backlight 106 and other components of the visual display 4 toward the imaging surface 13. To minimize undesirable reflections, an adhesive may be used to attach the ultrasonic sensor array 7 to the light-turning backlight 106 and to attach the light-turning backlight 106 to other components of the visual display 4. The adhesive may be selected to have minimal voids and occlusions and match acoustically with the components of the visual display 4. A low-index layer (not shown) may be attached to the upper and lower major surfaces of the light-turning backlight 106 in order to retain the TIR characteristics of the planar backlight 106.

Figure 8:
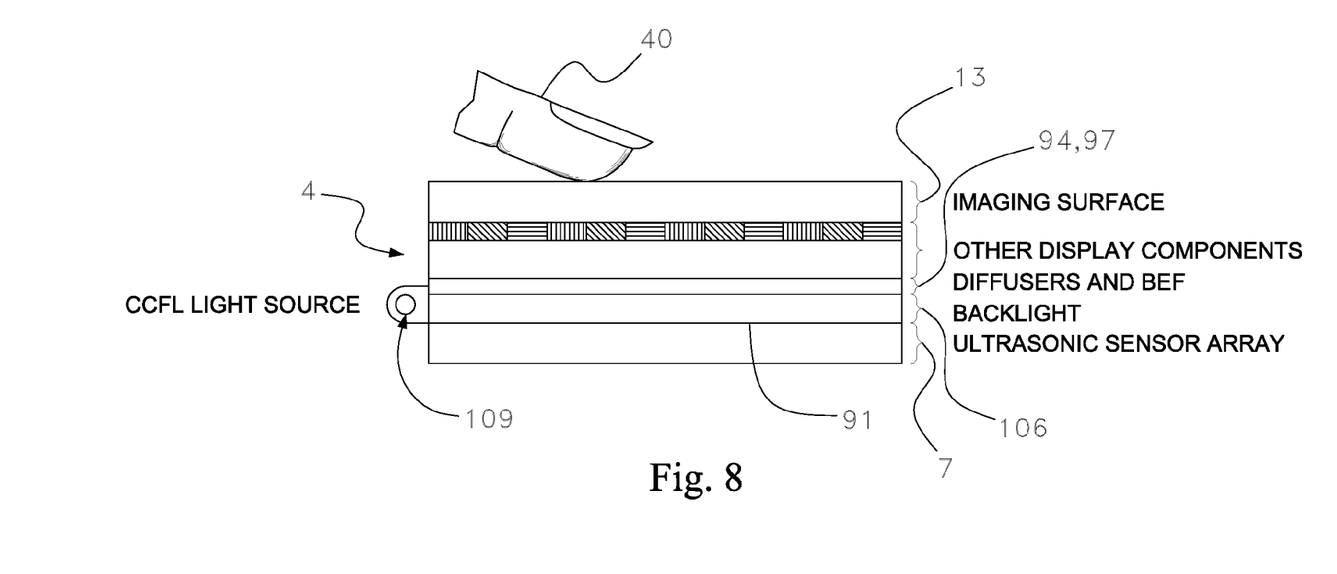
FIG. 8 depicts components of an ultrasonic sensor array and a visual display, where the ultrasonic sensor array is positioned behind a backlight and other components of the visual display.

FIG. 8 shows a cross-sectional view of a visual display 4 having a planar backlight 106 and an ultrasonic sensor array 7 positioned behind the backlight 106. As described above with respect to FIGS. 3A-5B, the ultrasonic sensor array 7 may be positioned behind a portion or all of the visual display 4, and in some configurations, extend beyond one or more edges of the visual display 4. To achieve uniform distribution of light from the backlight 106 through the active area of the LCD display 4, one or more layers of diffusers 97 and brightness enhancement films 94 (BEF) may be positioned between the backlight 106 and other components of the visual display 4. Conventionally, these BEF and diffuser layers 94, 97 include individual sheets that are stacked together without an adhesive. As such, these loosely stacked layers may have air gaps and voids that limit the transmission of high-frequency acoustic energy through the visual display 4. To improve the acoustic transmission, the BEF and diffuser layers 94, 97 may be bonded or laminated to each other, prior to installing in the visual display 4. Since conventional brightness enhancement films 94 may include a multitude of small prismatic features formed on the surface of the film and rely on an air interface to control the distribution of light from the backlight 106, the inclusion of an adhesive may require that one or more included angles of any lenticular or prismatic features be reduced (e.g. the pyramidal points sharpened) to account for a higher index of refraction of the bonding adhesive compared to air.

Figure 9:
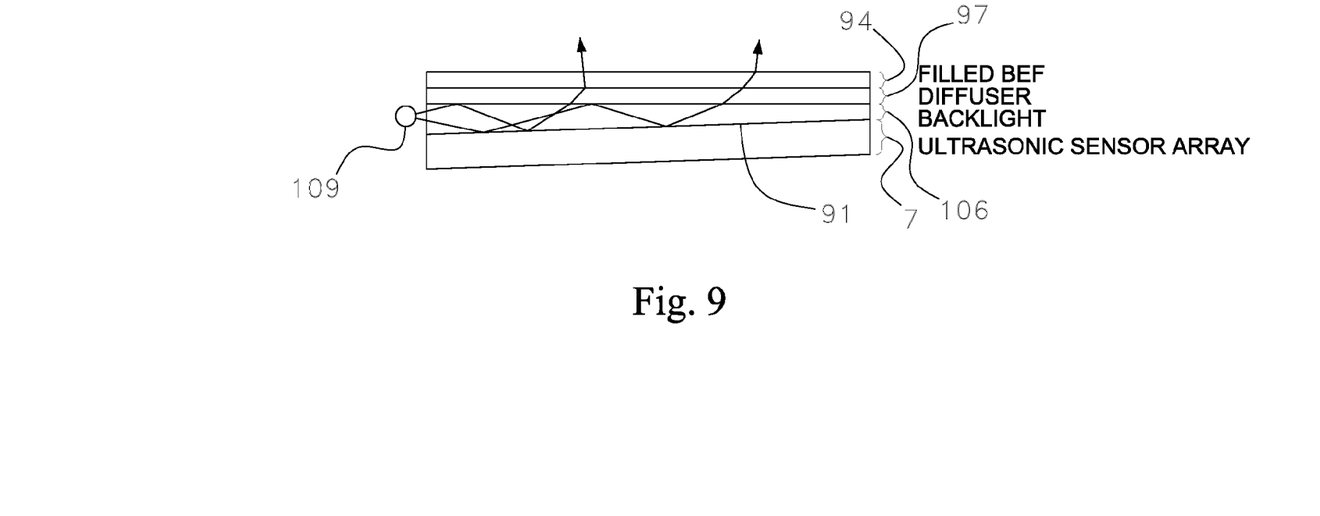
FIG. 9 depicts an ultrasonic sensor array and a portion of a visual display, where the ultrasonic sensor array is positioned behind a wedge-shaped backlight of the visual display.

FIG. 9 shows a cross-sectional view of a visual display 4 having a wedge-shaped backlight 106 and an ultrasonic sensor array 7 positioned behind the backlight 106. A wedge-shaped backlight 106 allows light traveling along the optical waveguide 91 to be internally reflected off of the top and bottom surfaces, until the criterion for successful TIR is not met at which point the light exits the waveguide 91. The angle of the wedge is generally selected to achieve uniform emission of light from the backlight 106. To accommodate the ultrasonic sensor array 7, one major surface of the optical waveguide 91 may be made visibly reflective, e.g. coated with a white paint or made reflective with a thin layer of metal. The other major surface of the optical waveguide 91 (the light-emitting surface) may be covered with a low-index film to control the extent of TIR, and the angle of the waveguide 91 may be controlled to spread the light throughout the waveguide 91.

The light-turning wedge-shaped backlight 106 may have an advantage that the ultrasonic wave reflected at the imaging surface 13 by the presence of the object 40 will arrive at the ultrasonic receiver 22 in a sweeping delaying fashion. One line of the array of pixel input electrodes 34 will receive the reflected ultrasonic signal at a slightly different time than an adjacent line of the array of pixel input electrodes 34. This can be advantageous since some existing ultrasonic systems require the ultrasonic transmitter 16 to be activated several times in order to refresh the charge on the pixel input electrodes 34 in order to compensate for charge-decay prior to reading of the charge. If the charge on a pixel input electrode 34 is not read out before the charge decays, another attempt at insonification must be made. With a wedge-shaped arrangement, the reflected ultrasonic energy wave will arrive at a particular row of pixel input electrodes 34 slightly after the preceding row of pixel input electrodes 34. This may allow for more line read-events for a single insonification pulse or wave, and reduce the power consumption of the ultrasonic sensor array 7.

It should be noted that a wedge-shaped backlight 106 is not required in order to achieve the benefits of positioning the ultrasonic sensor array 7 in a manner that is not parallel with the surface of the imaging surface 13 where the finger 40 resides. The sensing area 100 may be angled relative to surface of the imaging surface 13 by other means. For example, a wedge of material may be inserted between the ultrasonic sensor array 7 and the visual display 4 (or component thereof) in order to position the ultrasonic sensor array 7 at an angle relative to the imaging surface 13 of the visual display 4.

In some configurations, interstices, gaps and voids between components and within components of a visual display 4 may be filled with a material ideally having a high optical transmission (e.g. substantially clear); an acoustic impedance in the range of, for example, 1.5 to 15 MRayls; a low optical index (e.g. between 1.25 and 1.6); few bubbles or voids; and stable over time as well as over a desired temperature range. In this manner, interstices that would otherwise contain air instead contain a substance that is less likely to cause large amounts of ultrasonic energy to reflect. Materials that may be suitable for this purpose may include many types of adhesives, such as those identified above. For example, air gaps found normally in visual displays 4 within component layers and between component layers may be filled with an acoustically transmissive material that has acoustic properties similar to those of the component layers in order to minimize or eliminate reflection of the ultrasonic energy used by the ultrasonic sensor array 7. For example, an optically clear resin (OCR), an optically clear adhesive (OCA), an epoxy, a silicone gel, a polyurethane, and an acrylic are acoustically transmissive materials that may be used for this purpose.

In the case of a sensor array 7 that functions using ultrasound, in order to facilitate propagation through the display stack, it is recognized that an acoustically matched coupling material and/or a transmission media may be needed to fill air gaps or may be needed between layers of the stack of components for mechanical stability. This material should be selected to accommodate the optical path and have a minimum impact upon light transmission. For example, adhesives such as an epoxy, a pressure-sensitive adhesive (PSA), an OCA or an OCR may be used to mechanically, acoustically and optically couple the layers with minimal light loss. These layers may be applied, for example, by vacuum lamination, hot-roll lamination, cold-roll lamination, hot-pressing, cold-pressing, or other suitable bonding technique. Minimizing voids and air gaps is important for good optical transmission and imperative for good acoustic transmission. These methods may also be used for attaching the ultrasonic sensor array 7 to the display stack.

It will now be recognized that coupling an ultrasonic sensor array 7 with a visual display 4 can be performed at a stage in manufacturing the visual display 4 that is convenient. For example, the ultrasonic sensor array 7 may be coupled to the visual display 4 after manufacture of the visual display 4 is complete, or between steps of the manufacturing process, such as immediately prior to attaching the backlight 106 or an optical waveguide 91. As such, combining the ultrasonic sensor array 7 with the visual display 4 can be accomplished with little or no disruption to the visual display 4 manufacturing process.

One or more of the devices 1 described above may be implemented in a device, apparatus, or system for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices.

Figure 10:
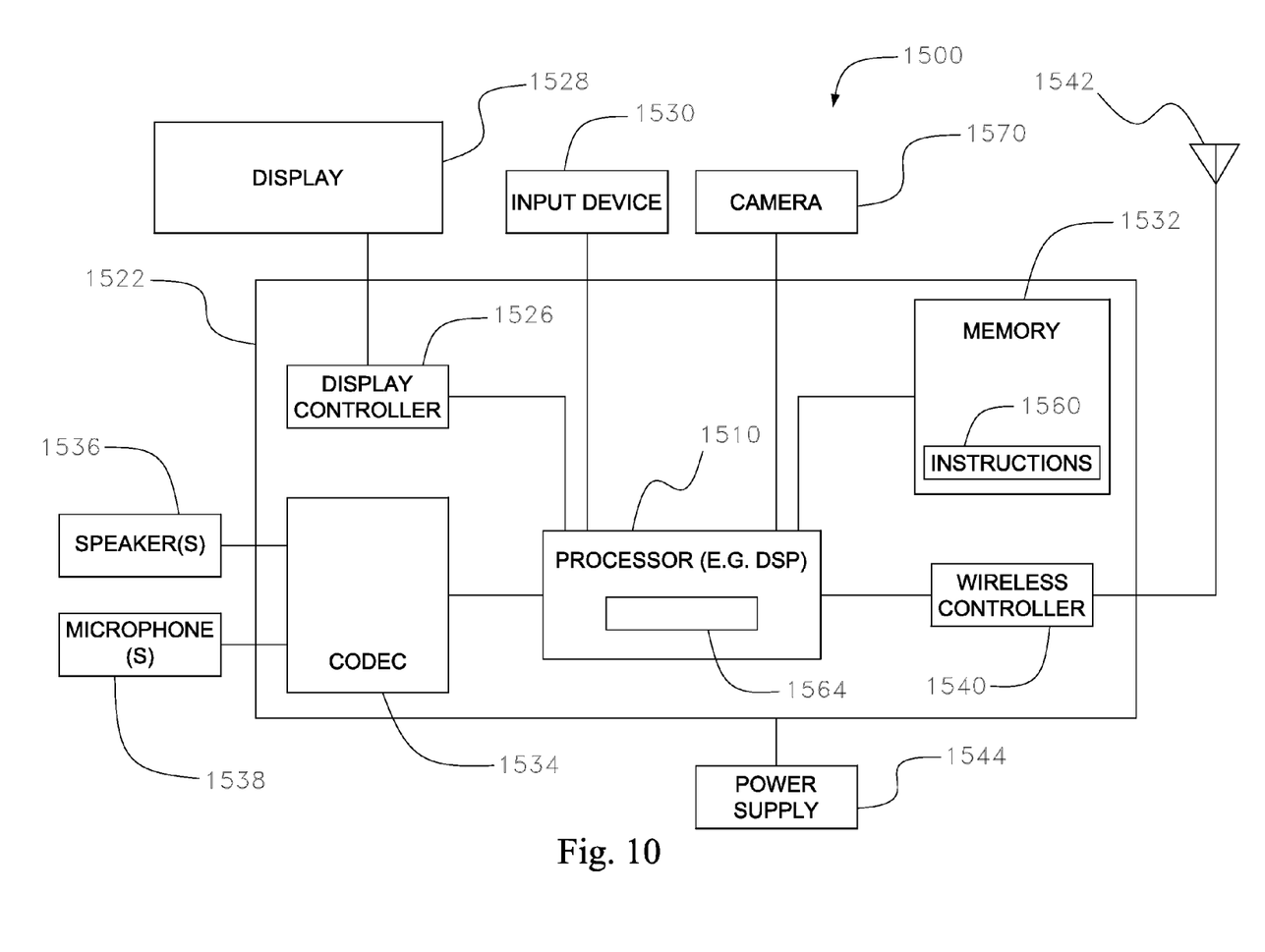
FIG. 10 is a block diagram of a mobile device such as a cell phone, which includes a device having an ultrasonic sensor array attached to a backside component of the visual display.

FIG. 10 is a block diagram of a particular illustrative embodiment of a mobile device 1500. The mobile device 1500 includes a processor 1510, such as a digital signal processor (DSP), coupled to a memory 1532. In an illustrative example, the processor 1510 includes image processing logic 1564, which may be stored on a computer readable medium, such as the memory 1532. When the processor 1510 is programmed to execute the processing logic 1564, the device 1500 may identify image features of captured images. The processor 1510 may be operable to perform various tasks assigned to the mobile device 1500. In a particular embodiment, the memory 1532 is a non-transitory computer readable medium that includes instructions 1560. The processor 1510 may be configured to execute the instructions 1560 stored in the memory 1532 to perform tasks assigned to the mobile device. In another illustrative example, the memory 1532 may store images captured by a camera 1570.

FIG. 10 also shows a display controller 1526 that is coupled to the processor 1510 and to a visual display 1528. The visual display 1528 may correspond to any of the displays depicted in FIGS. 3A-8. The visual display 1528, like the visual displays in FIGS. 3A-8, may be a touch-screen. A coder/decoder (CODEC) 1534 can also be coupled to the processor 1510. A speaker 1536 and a microphone 1538 can be coupled to the CODEC 1534. In a particular embodiment, the microphone 1538 may be configured to capture audio. The microphone 1538 may also be configured to capture audio while the camera 1570 captures video.

FIG. 10 also indicates that a wireless controller 1540 may be coupled to the processor 1510 and to an antenna 1542. In a particular embodiment, the processor 1510, the display controller 1526, the memory 1532, the CODEC 1534, and the wireless controller 1540 are included in a system-in-package or system-on-chip ("SoC") device 1522. In a particular embodiment, an input device 1530 and a power supply 1544 are coupled to the SoC device 1522. In a particular embodiment, as illustrated in FIG. 10, the visual display 1528, the input device 1530, the speaker 1536, the microphone 1538, the antenna 1542, the power supply 1544, and the camera 1570 are external to the SoC device 1522. However, each of the visual display 1528, the input device 1530, the speaker 1536, the microphone 1538, the antenna 1542, the power supply 1544, and the camera 1570 can be coupled to a component of the SoC device 1522, such as an interface or a controller.

Figure 11:
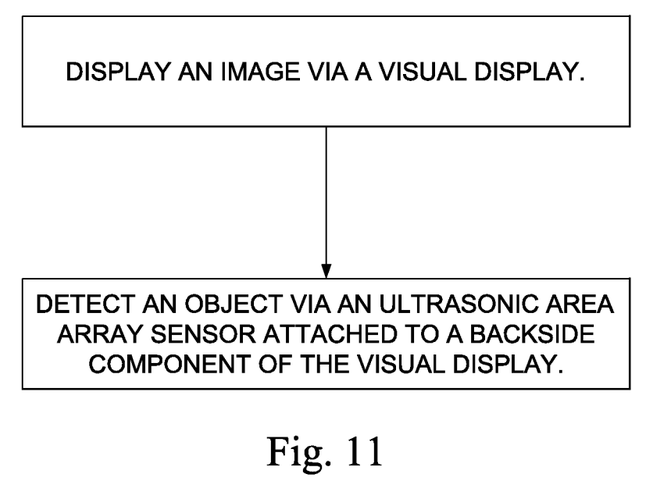
FIG. 11 is a flow diagram depicting steps of a method that may be executed by a processor.

It will now be recognized that an embodiment may take the form of a device 1 having (a) a means for displaying an image, and (b) a means for detecting an object using ultrasound attached to a backside component of the display means. Also, an embodiment may take the form of a computer-readable medium storing instructions 1560 that are executable by a processor 1510 to cause the processor 1510 to perform operations, including (a) displaying an image via a visual display, and (b) detecting an object via an ultrasonic sensor array attached to a backside component of the visual display. FIG. 11 is a flow chart depicting these operations.

Although embodiments have been described herein, the invention is not limited to such embodiments. It is understood that other embodiments of the present invention may be made without departing from the spirit and scope of the invention. Hence, the invention is deemed limited only by the appended claims and the reasonable interpretation thereof.

What is claimed is:

1. A display device, comprising:
a visual display capable of providing an image; and
an ultrasonic area array sensor attached to a backside component of the visual display such that a sensing area of the ultrasonic area array sensor is angled relative to an imaging surface of the visual display.

2. The device of claim 1, wherein the backside component is a backlight.

3. The device of claim 2, wherein the ultrasonic area array sensor is attached to a surface of the backlight that is furthest from an imaging surface of the display device.

4. The device of claim 2, wherein the ultrasonic area array sensor is attached to a surface of the backlight that is closest to an imaging surface of the display device.

5. The device of claim 1, wherein the backside component is an optical waveguide.

6. The device of claim 5, wherein the optical waveguide is planar or wedge shaped.

7. The device of claim 1, wherein the sensing area of the ultrasonic area array sensor is angled relative to the imaging surface of the visual display such that an ultrasonic wave from a piezoelectric transmitter of the ultrasonic area array sensor that is reflected off of an object proximate the visual display will arrive at different pixel input electrode rows of the ultrasonic area array sensor in a sweeping delay fashion.

8. The device of claim 1, wherein the ultrasonic area array sensor has a sensing area and the visual display has an image-providing area, and wherein the sensing area is smaller than the image-providing area.

9. The device of claim 1 wherein the ultrasonic area array sensor has a sensing area and the visual display has an image-providing area, and wherein the sensing area is substantially the same size as the image-providing area.

10. The device of claim 1, wherein the ultrasonic area array sensor has a sensing area and the visual display has an image-providing area, and wherein the sensing area is larger than the image-providing area.

11. The device of claim 1, wherein the ultrasonic area array sensor has a sensing area and the visual display has an image-providing area, and wherein the sensing area overlaps at least one edge of the image-providing area.

12. The device of claim 1, wherein the visual display includes liquid crystal material, organic light emitting diodes, one or more LEDs, or at least one cold cathode fluorescent lamp to produce an image.

13. The device of claim 1, wherein the visual display includes an optical waveguide with light-turning features.

14. The device of claim 13, wherein the light-turning features are filled with a non-gaseous material that allows for transmission of ultrasonic energy emitted by the ultrasonic area array sensor.

15. The device of claim 14, wherein the material has an acoustic impedance of between about 1.5 to 15 MRayls.

16. The device of claim 1, wherein the visual display comprises one or more component layers bonded to each other with an acoustically transmissive material.

17. The device of claim 1, wherein the visual display comprises at least one component layer that has an acoustically transmissive material filling interstices of the at least one component layer.

18. The device of claim 1, wherein the ultrasonic area array sensor is positioned between a backlight and a display TFT of the visual display.

19. A device, comprising:
means for displaying an image; and
means for detecting an object using an ultrasonic area array sensor attached to a backside component of the means for displaying an image, wherein the ultrasonic area array sensor is attached so that a sensing area of the ultrasonic area array sensor is angled relative to an imaging surface of the means for displaying an image.

20. The device of claim 19, wherein the backside component is a backlight.

21. The device of claim 20, wherein the means for detecting an object is attached to a surface of the backlight that is furthest from an imaging surface of the means for displaying an image.

22. The device of claim 20, wherein the means for detecting an object is attached to a surface of the backlight that is closest to an imaging surface of the means for displaying an image.

23. The device of claim 19, wherein the backside component is an optical waveguide.

24. The device of claim 23, wherein the optical waveguide is planar or wedge-shaped.

25. The device of claim 19, wherein the sensing area of the ultrasonic area array sensor is angled relative to the imaging surface of the means for displaying an image such that an ultrasonic wave from a piezoelectric transmitter of the ultrasonic area array sensor that is reflected off of an object proximate means for displaying an image will arrive at different pixel input electrode rows of the ultrasonic area array sensor in a sweeping delay fashion.

26. The device of claim 19, wherein the ultrasonic area array sensor has a sensing area and the means for displaying an image has an image-providing area, and wherein the sensing area is smaller than the image-providing area.

27. The device of claim 19 wherein the ultrasonic area array sensor has a sensing area and the means for displaying an image has an image-providing area, and wherein the sensing area is substantially the same size as the image-providing area.

28. The device of claim 19, wherein the ultrasonic area array sensor has a sensing area and the means for displaying an image has an image-providing area, and wherein the sensing area is larger than the image-providing area.

29. The device of claim 19, wherein the ultrasonic area array sensor has a sensing area and the means for displaying an image has an image-providing area, and wherein the sensing area overlaps at least one edge of the image-providing area.

30. The device of claim 19, wherein the means for displaying an image includes liquid crystal material, organic light emitting diodes, one or more LEDs, or at least one cold cathode fluorescent lamp to produce an image.

31. The device of claim 19, wherein the means for displaying an image includes a waveguide with light-turning features.

32. The device of claim 31, wherein the light-turning features are filled with a non-gaseous material that allows for transmission of acoustic energy from the ultrasonic area array sensor.

33. The device of claim 19, wherein the means for displaying an image comprises one or more component layers bonded to each other with an acoustically transmissive material.

34. The device of claim 19, wherein the means for displaying an image comprises at least one component layer that has an acoustically transmissive material filling interstices of the at least one component layer.

35. The device of claim 19, wherein the backside component is a backlight.

36. The device of claim 19, wherein the means for detecting an object is positioned between a backlight and a display TFT of the visual display.

37. A non-transitory computer-readable medium storing instructions that are executable by a processor to cause the processor to perform operations comprising:
    displaying an image via a visual display;
    causing an ultrasonic generator to generate an ultrasonic wave; and
    detecting an object via an ultrasonic area array sensor attached to a backside component of the visual display by reading rows of pixel input electrodes in the ultrasonic area array sensor, wherein the ultrasonic area array sensor is attached so that a sensing area of the ultrasonic area array sensor is angled relative to an imaging surface of the visual display and multiple rows of pixel input electrodes are read for each ultrasonic wave that is generated.

38. The computer-readable medium of claim 37, wherein the backside component is a backlight.

39. The computer readable medium of claim 38, wherein the ultrasonic area array sensor is attached to a surface of the backlight that is furthest from an imaging surface of the visual display.

40. The computer readable medium of claim 38, wherein the ultrasonic area array sensor is attached to a surface of the backlight that is closest to an imaging surface of the visual display.

41. The computer readable medium of claim 37, wherein the backside component is an optical waveguide.

42. The computer readable medium claim 41, wherein the waveguide is planar or wedge-shaped.

43. The computer readable medium of claim 37, wherein the sensing area of the ultrasonic area array sensor is angled relative to the imaging surface of the visual display such that an ultrasonic wave from a piezoelectric transmitter of the ultrasonic area array sensor that is reflected off of an object proximate the visual display will arrive at different pixel input electrode rows of the ultrasonic area array sensor in a sweeping delay fashion.

44. The computer readable medium of claim 37, wherein the ultrasonic area array sensor has a sensing area and the visual display has an image-providing area, and wherein the sensing area is smaller than the image-providing area.

45. The computer readable medium of claim 37, wherein the ultrasonic area array sensor has a sensing area and the visual display has an image-providing area, and wherein the sensing area is substantially the same size as the image-providing area.

46. The computer readable medium of claim 37, wherein the ultrasonic area array sensor has a sensing area and the visual display has an image-providing area, and wherein the sensing area is larger than the image-providing area.

47. The computer readable medium of claim 37, wherein the ultrasonic area array sensor has a sensing area and the visual display has an image-providing area, and wherein the sensing area overlaps at least one edge of the image-providing area.

48. The computer readable medium of claim 37, wherein the visual display includes liquid crystal material, organic light emitting diodes, one or more LEDs, or at least one cold cathode fluorescent lamp to produce an image.

49. The computer readable medium of claim 37, wherein the visual display includes an optical waveguide with light-turning features.

50. The computer readable medium of claim 49, wherein the light-turning features are filled with a non-gaseous material that allows the transmission of acoustic energy from the ultrasonic area array sensor.

51. The computer readable medium of claim 37, wherein the visual display comprises one or more component layers bonded to each other with an acoustically transmissive material.

52. The computer readable medium of claim 37, wherein the visual display comprises at least one component layer that has an acoustically transmissive material filling interstices of the at least one component layer.

53. The computer readable medium of claim 37, wherein the backside component is a backlight.

54. The computer readable medium of claim 37, wherein the ultrasonic area array sensor is positioned between a backlight and a display TFT of the visual display.

* * * * *